US012578416B2

(12) United States Patent
Manolakos et al.

(10) Patent No.: US 12,578,416 B2
(45) Date of Patent: Mar. 17, 2026

(54) BEAM PROXIMITY PRS PRIORITIZATION

(71) Applicant: QUALCOMM INCORPORATED, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/264,317

(22) PCT Filed: Jan. 29, 2022

(86) PCT No.: PCT/US2022/014458
§ 371 (c)(1),
(2) Date: Aug. 4, 2023

(87) PCT Pub. No.: WO2022/203762
PCT Pub. Date: Sep. 29, 2022

(65) Prior Publication Data
US 2024/0103116 A1 Mar. 28, 2024

(30) Foreign Application Priority Data
Mar. 23, 2021 (GR) .............................. 20210100182

(51) Int. Cl.
*G01S 5/00* (2006.01)
*G01S 5/02* (2010.01)
(Continued)

(52) U.S. Cl.
CPC .......... *G01S 5/0236* (2013.01); *G01S 5/0036* (2013.01); *H04L 5/0051* (2013.01); *H04W 72/563* (2023.01)

(58) Field of Classification Search
CPC .. G01S 5/0236; G01S 5/0036; G01S 5/02521; H04L 5/0051; H04L 5/0048;
(Continued)

(56) References Cited

U.S. PATENT DOCUMENTS 9,871,570 B1 * 1/2018 Kerhuel ................ H04W 64/00
2019/0268118 A1 * 8/2019 Sadiq ................ H04W 74/0833
(Continued)

OTHER PUBLICATIONS

International Search Report and Written Opinion—PCT/US2022/014458—ISA/EPO—Jun. 3, 2022.
(Continued)

*Primary Examiner* — Md K Talukder
(74) *Attorney, Agent, or Firm* — QUALCOMM Incorporated

(57) ABSTRACT

A method of processing PRS resources includes: receiving, at a UE, assistance data including a schedule of a plurality of PRS resources having a plurality of beam directions, each of the plurality of PRS resources corresponding to a respective source location; determining a processing priority of the plurality of PRS resources based on a proximity of each of the plurality of beam directions to a respective expected direction from the respective source location to the UE; and measuring one or more of the plurality of PRS resources based on the processing priority.

42 Claims, 11 Drawing Sheets

(51) Int. Cl.
    *H04L 5/00*          (2006.01)
    *H04W 72/563*     (2023.01)

(58) Field of Classification Search
    CPC ... H04W 72/563; H04W 64/00; H04W 24/08;
                       H04B 7/06952; H04B 17/252
    See application file for complete search history.

(56)             References Cited

U.S. PATENT DOCUMENTS

| | | | | |
|---|---|---|---|---|
| 2020/0178202 A1* | 6/2020 | Edge | .................... | G01S 1/0428 |
| 2021/0159992 A1* | 5/2021 | Sadiq | .................... | H04W 64/00 |
| 2021/0360570 A1* | 11/2021 | Manolakos | .......... | G01S 1/0428 |
| 2023/0047727 A1* | 2/2023 | Si | .......................... | H04W 52/02 |
| 2023/0079536 A1* | 3/2023 | Yu | ........................ | H04W 24/08 |
| | | | | 370/252 |
| 2024/0103116 A1* | 3/2024 | Manolakos | .......... | H04B 7/0695 |

OTHER PUBLICATIONS

Qualcomm Incorporated: "Maintenance on DL Reference Signals for NR Positioning", 3GPP Draft, R1-2004469, 3GPP TSG RAN WG1 #101-e, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886198, pp. 1-5, sections 1, 3 and 5.

VIVO: "Discussion on Potential Positioning Enhancements", 3GPP TSG RAN WG1 #103-e, R1-2007666, 3GPP, Mobile Competence Centre, 650, Route Des Lucioles, F-06921, Sophia-Antipolis Cedex, France, vol. RAN WG1, No. e-Meeting, Oct. 26, 2020-Nov. 13, 2020, Oct. 17, 2020, XP051939828, 49 Pages, paragraph [3.1.2], p. 30.

* cited by examiner

| Beam | 1 | 2 | 3 | 4 | 5 | 6 | 7 | 8 | 9 | 10 |
|---|---|---|---|---|---|---|---|---|---|---|
| 920 AD priority | 1 | 2 | 3 | 4 | 5 | 6 | 7 | 8 | 9 | 10 |
| 930 Beam proximity (°) | 65 | 50 | 35 | 20 | 5 | 10 | 25 | 40 | 55 | 70 |
| 940 Beam proximity priority | 9 | 7 | 5 | 3 | 1 | 2 | 4 | 6 | 8 | 10 |

1100

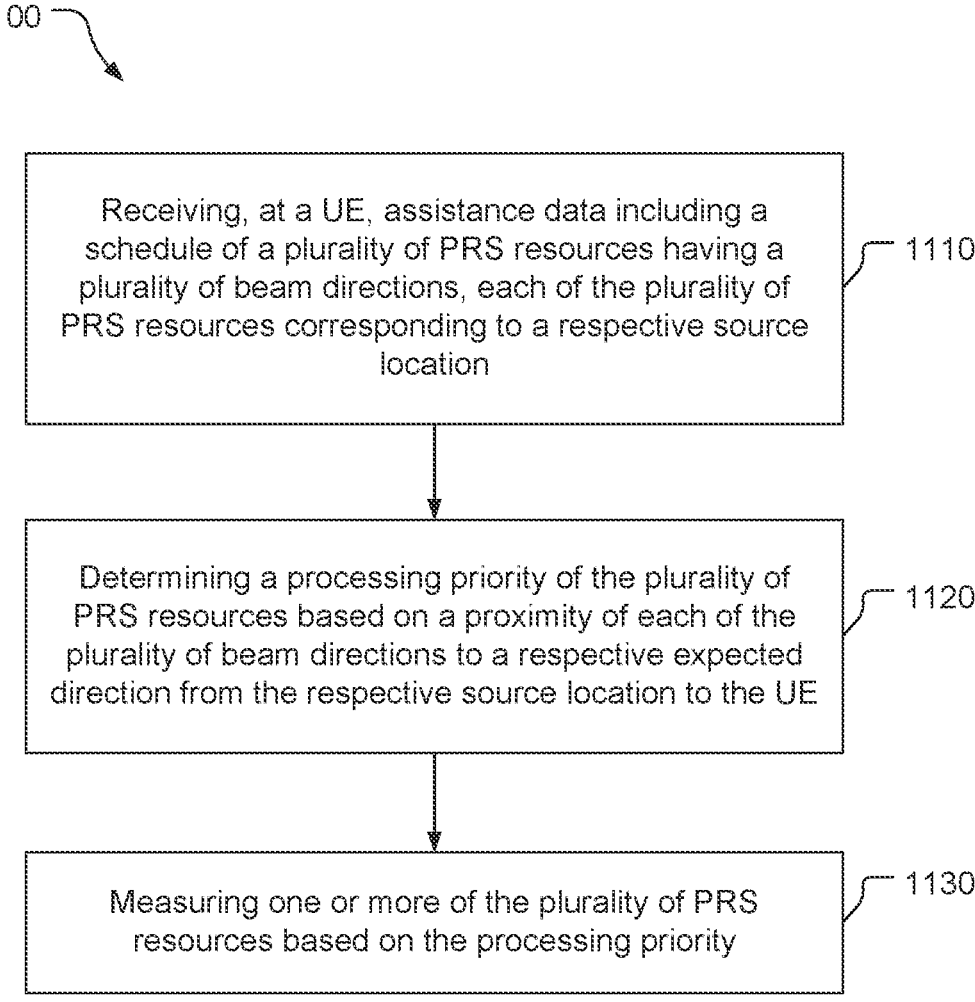

Receiving, at a UE, assistance data including a schedule of a plurality of PRS resources having a plurality of beam directions, each of the plurality of PRS resources corresponding to a respective source location — 1110

Determining a processing priority of the plurality of PRS resources based on a proximity of each of the plurality of beam directions to a respective expected direction from the respective source location to the UE — 1120

Measuring one or more of the plurality of PRS resources based on the processing priority — 1130

FIG. 11

BEAM PROXIMITY PRS PRIORITIZATION

CROSS-REFERENCE TO RELATED APPLICATIONS

This application is the National Stage of International Application No. PCT/US2022/014458, filed Jan. 29, 2022, entitled "BEAM PROXIMITY PRS PRIORITIZATION," which claims the benefit of Greek patent application No. 20210100182, filed Mar. 23, 2021, entitled "BEAM PROX-IMITY PRS PRIORITIZATION," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example UE (user equipment) includes: a transceiver; a memory; and a processor, communicatively coupled to the transceiver and the memory, configured to: receive assistance data including a schedule of a plurality of PRS resources (positioning reference signal resources) having a plurality of beam directions, each of the plurality of PRS resources corresponding to a respective source location; determine a processing priority of the plurality of PRS resources based on a proximity of each of the plurality of beam directions to a respective expected direction from the respective source location to the UE; and measure one or more of the plurality of PRS resources based on the processing priority.

Implementations of such a UE may include one or more of the following features. The processor is configured to determine the processing priority in response to the assistance data including the respective expected direction for each of the plurality of PRS resources. The processor is configured to determine separate processing sub-priorities, as parts of the processing priority, for different resource sets of the plurality of PRS resources. The processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources. The processor is configured to report one or more measurements of the one or more of the plurality of PRS resources based on the processing priority. The processor is configured to determine the processing priority in response to PRS resource measurements being requested for an angle-of-departure positioning technique. The processor is configured to determine the processing priority in response to PRS resource measurements being requested for concurrent support of an angle-of-departure positioning technique and at least one of a time-difference-of-arrival positioning technique or a round-trip-time positioning technique. The proximity of each of the plurality of beam directions to the respective expected direction is an azimuth proximity of a first azimuth direction of each of the plurality of beam directions to a respective second azimuth direction of the respective expected direction. The proximity of each of the plurality of beam directions to the respective expected direction is an elevation proximity of a first elevation direction of each of the plurality of beam directions to a respective second elevation direction of the respective expected direction. The proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction. The plurality of PRS resources includes a plurality of downlink PRS resources or a plurality of sidelink PRS resources.

An example method of processing PRS resources includes: receiving, at a UE, assistance data including a schedule of a plurality of PRS resources having a plurality of beam directions, each of the plurality of PRS resources corresponding to a respective source location; determining a processing priority of the plurality of PRS resources based on a proximity of each of the plurality of beam directions to a respective expected direction from the respective source location to the UE; and measuring one or more of the plurality of PRS resources based on the processing priority.

Implementations of such a method may include one or more of the following features. The processing priority is determined in response to the assistance data including the respective expected direction for each of the plurality of PRS resources. Determining the processing priority includes determining separate processing sub-priorities, as parts of the processing priority, for different resource sets of the plurality of PRS resources. The processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources. The method includes reporting one or more measurements of the one or more of the plurality of PRS resources based on the processing priority. The processing priority is determined in response to PRS resource measurements being requested for an angle-of-departure positioning technique. The processing priority is determined in response to PRS resource measurements being requested for concurrent support of an angle-of-departure positioning technique and at least one of a time-difference-of-arrival positioning technique or a round-trip-time positioning technique. The proximity of each of the plurality of beam directions to the respective expected direction is an azimuth proximity of a first azimuth direction of each of the plurality of beam directions to a respective second azimuth direction of the respective expected direction. The proximity of each of the plurality of beam directions to the respective expected direction is an elevation proximity of a first elevation direction of each of the plurality of beam directions to a respective second elevation direction of the respective expected direction. The proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction. The plurality of PRS resources includes a plurality of downlink PRS resources or a plurality of sidelink PRS resources.

Another example UE includes: means for receiving assistance data including a schedule of a plurality of PRS resources having a plurality of beam directions, each of the plurality of PRS resources corresponding to a respective source location; means for determining a processing priority of the plurality of PRS resources based on a proximity of each of the plurality of beam directions to a respective expected direction from the respective source location to the UE; and means for measuring one or more of the plurality of PRS resources based on the processing priority.

Implementations of such a UE may include one or more of the following features. The means for determining the processing priority include means for determining the processing priority in response to the assistance data including the respective expected direction for each of the plurality of PRS resources. The means for determining the processing priority include means for determining separate processing sub-priorities, as parts of the processing priority, for different resource sets of the plurality of PRS resources. The processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources. The UE includes means for reporting one or more measurements of the one or more of the plurality of PRS resources based on the processing priority. The means for determining the processing priority include means for determining the processing priority in response to PRS resource measurements being requested for an angle-of-departure positioning technique. The means for determining the processing priority include means for determining the processing priority in response to PRS resource measurements being requested for concurrent support of an angle-of-departure positioning technique and at least one of a time-difference-of-arrival positioning technique or a round-trip-time positioning technique. The proximity of each of the plurality of beam directions to the respective expected direction is an azimuth proximity of a first azimuth direction of each of the plurality of beam directions to a respective second azimuth direction of the respective expected direction. The proximity of each of the plurality of beam directions to the respective expected direction is an elevation proximity of a first elevation direction of each of the plurality of beam directions to a respective second elevation direction of the respective expected direction. The proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

An example non-transitory, processor-readable storage medium includes processor-readable instructions to cause a processor of a UE to: receive assistance data including a schedule of a plurality of PRS resources having a plurality of beam directions, each of the plurality of PRS resources corresponding to a respective source location; determine a processing priority of the plurality of PRS resources based on a proximity of each of the plurality of beam directions to a respective expected direction from the respective source location to the UE; and measure one or more of the plurality of PRS resources based on the processing priority.

Implementations of such a storage medium may include one or more of the following features. The processor-readable instructions to cause the processor to determine the processing priority include processor-readable instructions to cause the processor to determine the processing priority in response to the assistance data including the respective expected direction for each of the plurality of PRS resources. The processor-readable instructions to cause the processor to determine the processing priority include processor-readable instructions to cause the processor to determine separate processing sub-priorities, as parts of the processing priority, for different resource sets of the plurality of PRS resources. The processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources. The storage medium includes processor-readable instructions to cause the processor to report one or more measurements of the one or more of the plurality of PRS resources based on the processing priority. The processor-readable instructions to cause the processor to determine the processing priority include processor-readable instructions to cause the processor to determine the processing priority in response to PRS resource measurements being requested for an angle-of-departure positioning technique. The processor-readable instructions to cause the processor to determine the processing priority include processor-readable instructions to cause the processor to determine the processing priority in response to PRS resource measurements being requested for concurrent support of an angle-of-departure positioning technique and at least one of a time-difference-of-arrival positioning technique or a round-trip-time positioning technique. The proximity of each of the plurality of beam directions to the respective expected direction is an azimuth proximity of a first azimuth direction of each of the plurality of beam directions to a respective second azimuth direction of the respective expected direction. The proximity of each of the plurality of beam directions to the respective expected direction is an elevation proximity of a first elevation direction of each of the plurality of beam directions to a respective second elevation direction of the respective expected direction. The proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

BRIEF DESCRIPTION OF THE DRAWINGS

FIG. 11 is a block flow diagram of a method of processing PRS.

DETAILED DESCRIPTION

Figure 1:
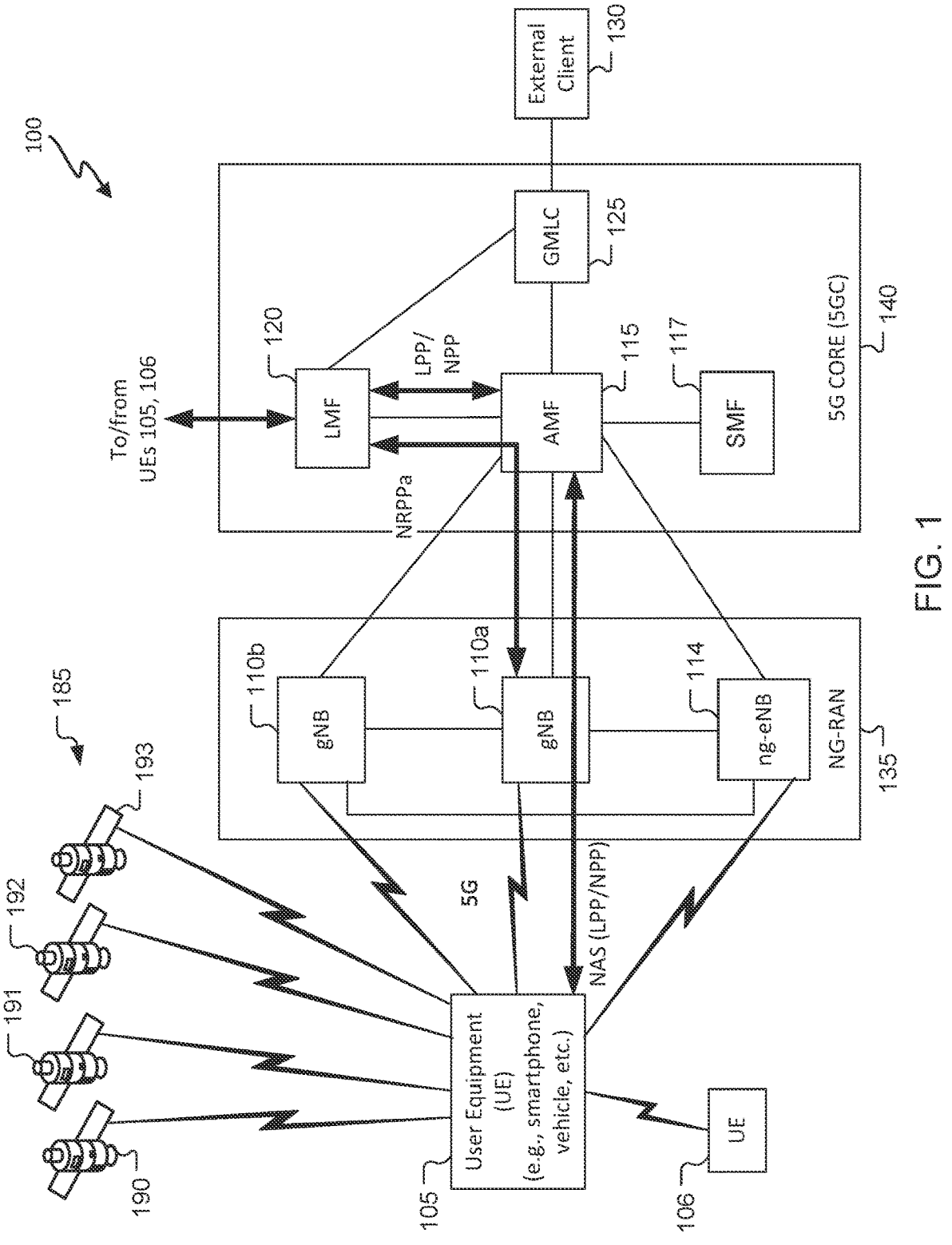
FIG. 1 is a simplified diagram of an example wireless communications system.

Techniques are discussed herein for processing PRS (positioning reference signal(s)). For example, PRS resources may be processed based on proximity of respective beam directions corresponding to the PRS resources and the direction(s) from the source location(s) of the PRS resources to a UE (user equipment). For example, PRS resources whose beams are closer to the direction(s) from the source location(s) to the UE may be prioritized higher for measurement and/or reporting than PRS resources whose beams are further away from the direction(s) from the source location(s) to the UE. These are examples, and other examples may be implemented.

Items and/or techniques described herein may provide one or more of the following capabilities, as well as other capabilities not mentioned. Positioning accuracy and/or latency may be improved, e.g., by obtaining desired PRS measurements. Energy may be reduced for measuring PRS resources, reporting PRS resource measurements, and/or processing PRS resource measurements. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b, and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the base stations, e.g., one or more of the gNBs 110a, 110b, and/or the ng-eNB 114 may be configured to communicate with the UE 105 via multiple carriers. Each of the gNBs 110a, 110b, and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b, and/or the ng-eNB 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b, and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS (Synchronization Signals) or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
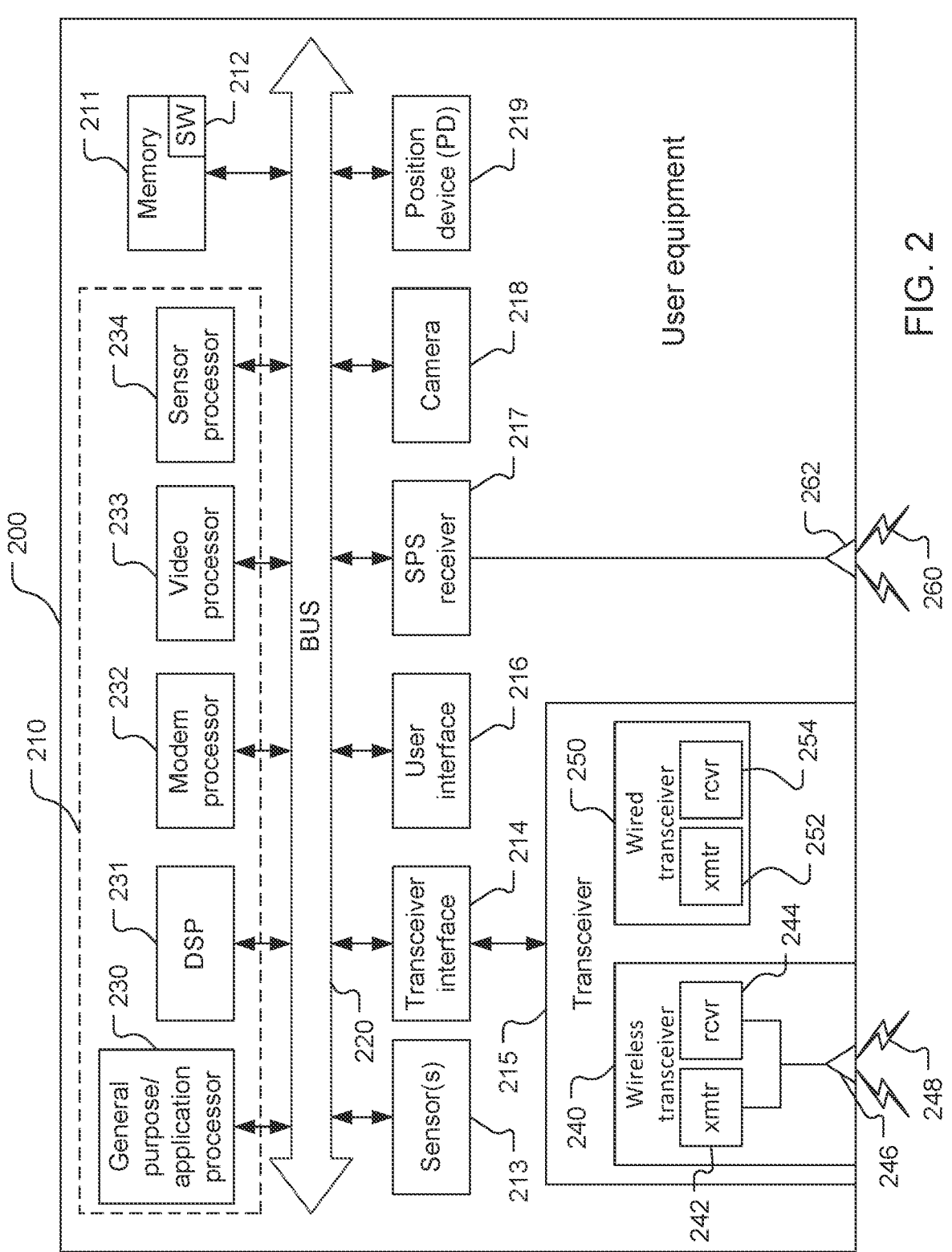
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. Alternatively, the magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
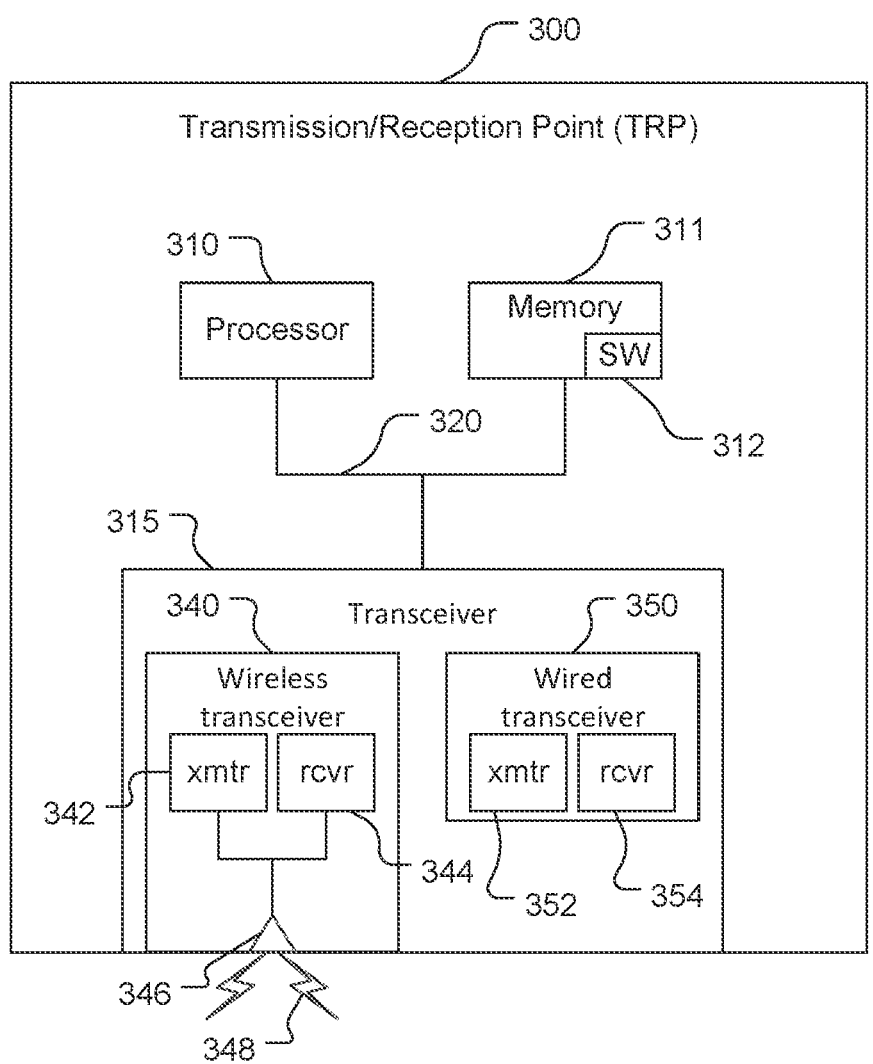
FIG. 3 is a block diagram of components of an example transmission/reception point.

Referring also to FIG. 3, an example of a TRP 300 of the gNBs 110*a*, 110*b*, and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b*, and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
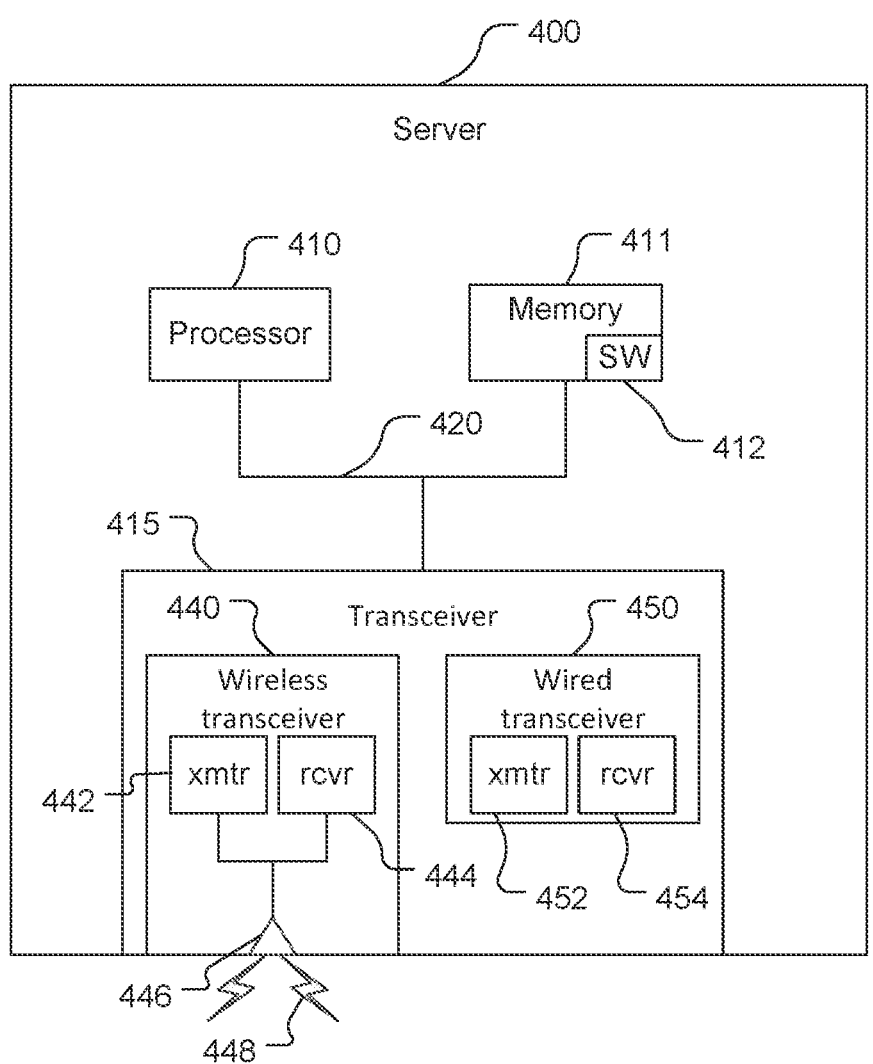
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{RX \to TX}$ (i.e., UE $T_{Rx\text{-}Tx}$ or UE$_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or LE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Na resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell.

The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

PRS Resource Prioritization

Processing of PRS resources may be prioritized. For example, prioritizing measuring and/or reporting of PRS resources (e.g., DL-PRS resources and/or SL-PRS resources) may help improve positioning accuracy by measuring PRS resources that are most likely to yield good measurements and avoiding measurements that detract from measurement accuracy, may improve positioning latency and save energy by avoiding measurement of PRS resources that detract from and/or have very little effect on positioning accuracy and avoiding calculating position information (e.g., range(s), location estimate(s)) from such measurements. Processing of PRS resources may be prioritized based on proximity of beams of the PRS resources to a UE. For example, beams with directed close to respective direction(s) of a UE relative to the source location(s) of the beams may be given higher processing priority than beams further from the respective direction(s) of the UE. Thus, the UE may measure PRS resources and/or report PRS resource measurements for PRS resources with beams pointed close to the UE instead of PRS resources with beams pointed further away from the UE.

Figure 5:
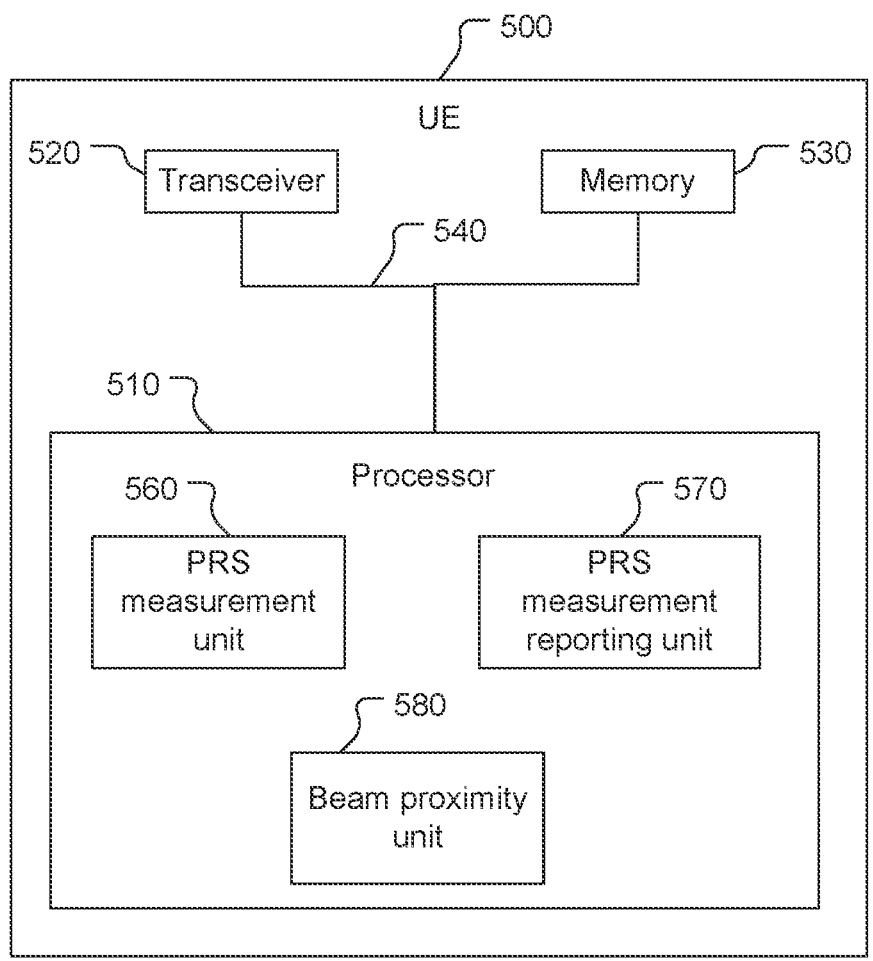
FIG. 5 is a block diagram of an example user equipment.

Referring also to FIG. 5, a UE 500 includes a processor 510, a transceiver 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a PRS measurement unit 560, a PRS measurement reporting unit 570, and a beam proximity unit 580. The PRS measurement unit 560, the PRS measurement reporting unit 570, and the beam proximity unit 580 are discussed further below, and the description may refer to the processor 510 generally, or the UE 500 generally, as performing any of the functions of the PRS measurement unit 560, the PRS measurement reporting unit 570, and/or the beam proximity unit 580, with the UE 500 configured to perform functions of the PRS measurement unit 560, the PRS measurement reporting unit 570, and the beam proximity unit 580.

PRS measurements may be used to help with position determination of mobile devices such as the UE 500. For example, various PRS measurements may be used to support UE-assisted and/or UE-based position calculation using one or more of a variety of positioning techniques. For example, DL-PRS may be measured by the PRS measurement unit 560 to determine RSTD for DL-TDOA or to determine RSRP for DL-TDOA, DL-AoD, and/or multi-RTT techniques. As another example, DL-PRS and UL-PRS may be measured by the PRS measurement unit 560 to determine a UE Rx-Tx time difference for multi-RTT. As another example, SSB or CSI-RS (Channel State Information Reference Signal) for RRM (Radio Resource Management) may be measured by the PRS measurement unit 560 to determine SS-RSRP (Synchronization Signal RSRP for RRM), SS-RSRQ (for RRM), CSI-RSRP (for RRM), CSI-RSRQ (for RRM) for E-CID.

The UE 500 may be limited as to what measurements may be made and/or reported and assistance data (AD) may be provided to the UE 500 that the UE 500 may use to determine which PRS resources to measure and/or report if not all of the PRS resources may be measured and reported. For example, the PRS measurement unit 560 may be limited in how many PRS resources the PRS measurement unit 560 may measure (e.g., X PRS resources) and the AD may schedule more PRS resources (e.g., Y PRS resources) than the UE 500 can measure (e.g., Y>X). The PRS measurement unit 560 may be configured to use an order indicated by the AD of the PRS resources as a priority of the PRS resources for measurement. The order may be indicated by a physical order of the indications of the PRS resources in the AD and/or by another means, e.g., by index numbers corresponding to the PRS resources. The order of the PRS resources may be a first order of frequency layers, a respective second order of TRPs within each frequency layer, a respective third order of PRS resource sets for each TRP, and a fourth order of PRS resources for each PRS resource set. The UE 500 may be configured to implement processing priority in accordance with the 3GPP 38.214 standard that provides that within a positioning frequency layer an nr-DL-PRS-ReferenceInfo parameter indicates a highest priority for measurement, and that up to 64 TRP IDs (dl-PRS-IDs) of each frequency layer are sorted according to a priority and up to two DL PRS resource sets per TRP ID of the frequency layer are sorted according to a priority. The UE 500 may be configured to prioritize selection of PRS resources to measure, e.g., for Rx-Tx measurements, based on relative timing of PRS resources. For example, the UE 500 may be configured to measure a DL-PRS resource only if a UL-PRS resource is scheduled within a threshold time of the DL-PRS resource, e.g., to avoid unacceptable clock drift rendering an Rx-Tx measurement unacceptably inaccurate. The UE 500 may be requested to associate a measurement of a primary PRS resource with one or more measurements of one or more secondary PRS resources, e.g., one or more adjacent PRS resources (with beams adjacent to the beam of the primary PRS resource). The AD may help the UE 500 measure and/or process positioning signals, e.g., to reduce time to measure the signals and/or to improve the accuracy of the measurements. The AD may include, for example, pathloss, spatial relation information, SSB (Synchronization Signal Block) information, PRS acquisition information (e.g., frequency, bandwidth, timing, coding, etc.) to help the UE 500 measure positioning signals.

Figure 6:
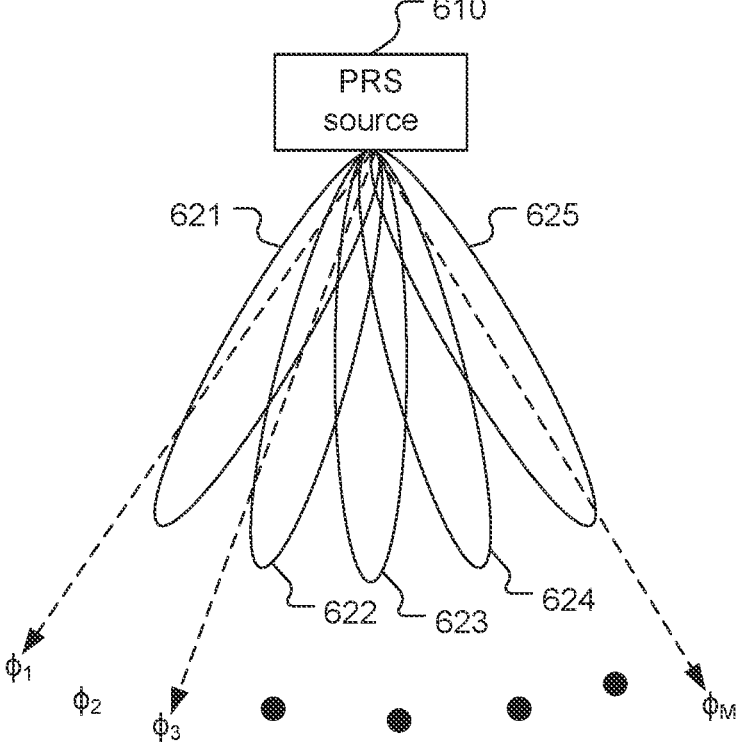
FIG. 6 is a simplified top view of a positioning reference signal (PRS) source transmitting five positioning reference signal resources in five corresponding beams.

Referring also to FIG. 6, assistance data may be provided to the UE 500 indicating beam directions of PRS resources. For example, an NR-PositionCalculationAssistance IE (Information Element) may be provided by the server 400 to enable UE-based downlink positioning, e.g., for DL-AoD. This IE may provide information as follows.

```
-- ASN1START

NR-PositionCalculationAssistance-r16 ::= SEQUENCE {
    nr-TRP-LocationInfo-r16      NR-TRP-LocationInfo-r16      OPTIONAL, --
Need ON
    nr-DL-PRS-BeamInfo-r16      NR-DL-PRS-BeamInfo-r16      OPTIONAL, --
Need ON
```

-continued

| nr-RTD-Info-r16 | NR-RTD-Info-r16 | OPTIONAL, -- |
| Need ON | | |

```
    ...
}
-- ASN1STOP
``` where nr-TRP-LocationInfo-r16 provides location coordinates of antenna reference points of a TRP, nr-DL-PRS-BeamInfo provides spatial directions of DL-PRS resources for the TRPs, and nr-RTD-Info provides time synchronization information between a reference TRP and neighbor TRPs. Beam information for each PRS resource may be provided in a DL-PRS-BeamInfoElement that includes an azimuth angle and an elevation angle. The azimuth angle may be provided as a combination of a coarse azimuth angle and a fine azimuth angle and the elevation angle may be provided as a combination of a coarse elevation angle and a fine elevation angle. Thus, for example, location coordinates may be provided for a PRS source 610 (e.g., a TRP or part of a TRP), and azimuth and elevation angles may be provided for each of beams 621, 622, 623, 624, 625 corresponding to respective PRS resources, although only azimuth angles are shown in FIG. 6.

Vectors of normalized expected powers from multiple beams may be used to determine an AoD from the PRS source 610 to the UE 500, e.g., for AoD positioning of the UE 500. For example, for each combination of potential angle $\phi_k$ from the PRS source 610 (e.g., $\phi1, \phi2, \ldots, \phi m$) and beam l (where $l \in [1, 2, \ldots, N]$), an expected receive power $P_{\phi_k,l}$ is determined from known antenna performance (antenna patterns of each PRS resource) of the PRS source 610 and/or from crowdsourced measurements. A normalized vector $P_k$ of expected received powers for each beam and a particular potential angle (normalized to the highest received power from any of the beams for that potential angle) can be calculated according to $$P_k = \begin{bmatrix} \dfrac{P_{\phi_k,1}}{\max\limits_l(P_{\phi_k,l})} \\ \vdots \\ \dfrac{P_{\phi_k,N}}{\max\limits_l(P_{\phi_k,l})} \end{bmatrix} \tag{1}$$

Using Equation (1), a matrix R can be determined according to $$R=[P_1 \, P_2 \ldots P_M] \tag{2}$$

Equations (1) and (2) may be used to determine an AoD relative to the PRS source 610. PRS resources are sent to a UE from the PRS source 610. The UE measures the PRS resources and reports a normalized vector $\hat{P}$ of received powers from each of the PRS resources (beams). The normalized vector $\hat{P}$ is compared with the vector R of Equation (2) to find a value of $\hat{k}$ such that the corresponding normalized vector $P_{\hat{k}}$ is closest to $\hat{P}$, and the corresponding angle $\phi_{\hat{k}}$ may be used as the AoD for the UE. Interpolation may be used regarding the two closest vectors in the matrix R to determine the AoD for the UE. Time and energy may be conserved to determine the AoD for the UE by limiting the number of beams that are measured to determine respective received powers, and used in comparing the vector $P_{\hat{k}}$ to the matrix R, to beams near the AoD of the UE 500 without significantly (if at all) affecting the accuracy of the determined AoD. While a server 400 may disregard measurements that may be of little help or that may worsen positioning accuracy, energy may be saved by avoiding making such measurements, providing the measurements to the server 400, and having the server 400 discard the measurements.

Figure 7:
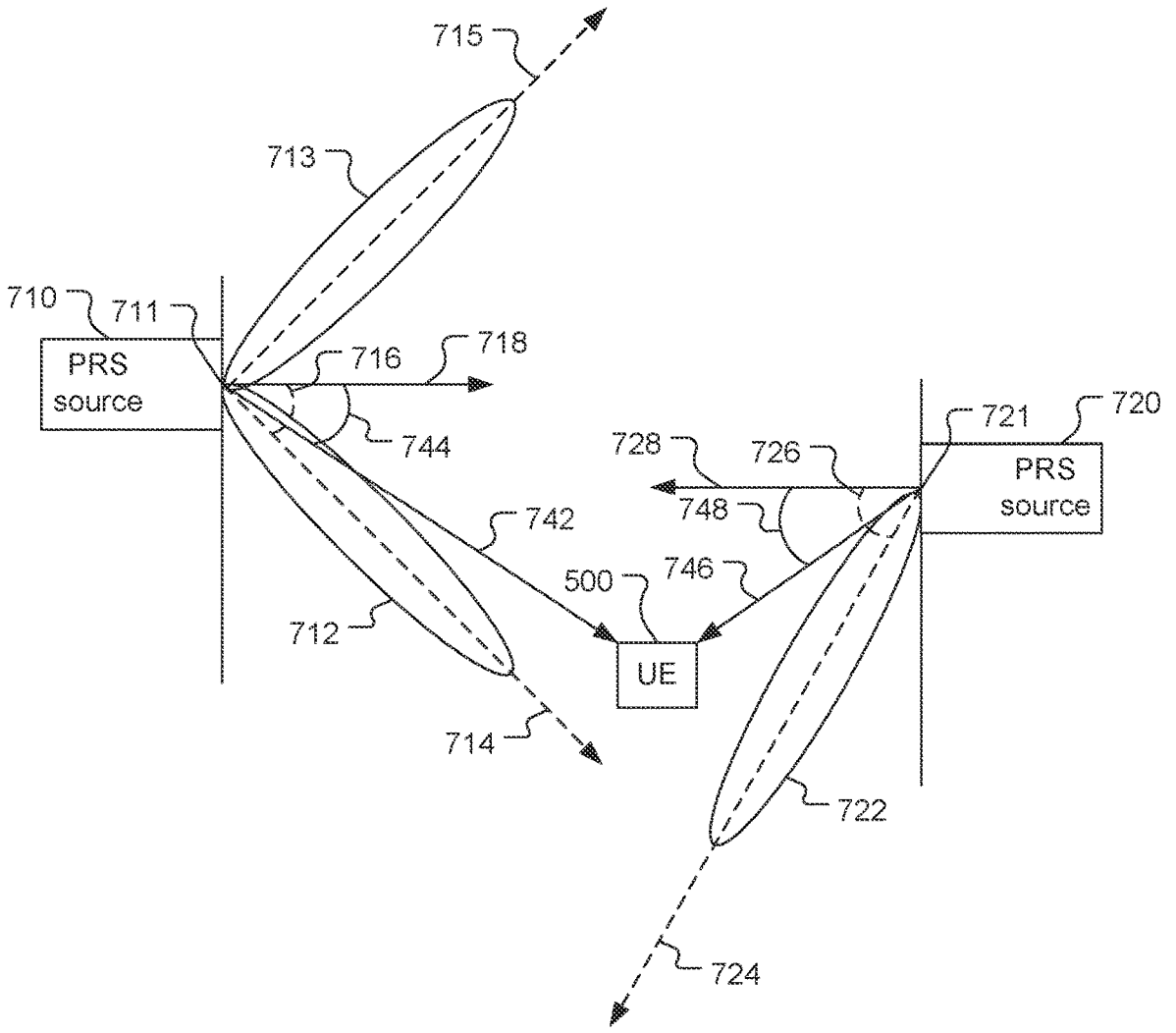
FIG. 7 is a simplified view of multiple PRS sources, beam directions, and reference directions.

Referring also to FIG. 7, PRS sources 710, 720 may produce beams with varying proximity to reference directions from the PRS sources 710, 720 to the UE 500. The PRS sources 710, 720 may be portions of a single TRP 300 with a distributed antenna system (e.g., the antenna 346 may include a distributed antenna system). In this example, the PRS source 710 produces a beam 712 transmitting a corresponding PRS resource, with the beam 712 having a beam direction 714 relative to a source location 711 of the PRS source 710, e.g., having a beam angle 716 relative to a direction 718 (in this example, that is normal to an antenna panel of the PRS source 710 producing the beam 712 and intersecting the source location 711). Similarly, a PRS source 720 produces a beam 722 transmitting a corresponding PRS resource, with the beam 722 having a beam direction 724 relative to a source location 721 of the PRS source 720, e.g., having a beam angle 726 relative to a direction 728 (in this example, that is normal to an antenna panel of the PRS source 720 producing the beam 722 and intersecting the source location 721). The PRS source 710 also produces a beam 713 with a beam direction 715. While FIG. 7 shows the PRS source 710 producing the beams 712, 713 and the PRS source 720 transmitting only the single beam 722, either or both of the PRS sources 710, 720 may transmit one or more other beams corresponding to one or more other respective PRS resources. The source location 711 is the same for both of the beams 712, 713, with the source location 711 being a point from which the beams 712, 713 are considered to emanate even though the beams 712, 713 are each produced by one or more antenna elements (possibly the same antenna element(s)) that span more than a point location. The beam 722 is considered to emanate from the source location 721 of the PRS source 720. The beams 712, 713, and the corresponding beam directions 714, 715, correspond to the source location 711 and the beam 722, and the corresponding beam direction 724, corresponds to the source location 721. In this example, the source locations 711, 721 are different (disposed at different positions in space). The UE 500 is disposed at a reference direction 742 relative to the source location 711 and at a reference direction 746 relative to the source location 721. The reference direction 742 is at a reference angle 744 relative to the direction 718 and the reference direction 746 is at a reference angle 748 relative to the direction 728. While FIG. 7 is a two-dimensional figure, with the directions 714, 715, 724, 742, 746 being shown as azimuthal directions, any of the beam directions of PRS resources and/or the reference directions from source locations to the UE 500 may comprise an azimuthal component and an elevation component (i.e., an azimuthal direction and an elevation direction). The beam directions 714, 715, 724 may be constant, while the reference directions 742, 746 depend on the location of the UE 500 and thus may change with change in location of the UE 500. A reference direction may not change with change in location of the UE 500 if, for example, the reference location is an azimuthal direction only and the UE 500 moves further from or closer to the source location but along the same azimuthal direction. A reference direction may not change (from a practical standpoint) if the UE 500 changes location within a granularity of a reference direction determination.

The beam proximity unit 580 may be configured to obtain beam directions and expected directions (estimates of reference directions) in one or more of a respective variety of ways. For example, the beam proximity unit 580 may be configured to obtain the beam directions 714, 715, 724 for the beams 712, 713, 722 (and thus the corresponding PRS resources) from AD from the server 400 via the TRP 300. As another example, expected directions (which may be called expected UE directions), which are estimates of the reference directions 742, 744, may be determined (e.g., by the server 400 and/or by the UE 500) using (known coordinates of) the source locations 711, 721 and an estimated location of the UE 500. The estimated location of the UE 500 may be determined using one or more of a variety of techniques, e.g., E-CID, SPS, etc. The beam proximity unit 580 may obtain the expected directions by determining estimates of the directions 742, 744 and/or by receiving estimates of the directions 742, 744 from an entity, e.g., the server 400, that determined the estimates of the directions 742, 744. For example, the expected direction from each PRS source location may be provided in assistance data to the UE 500. As another example, if the UE 500 does not move significantly after determining the AoD using Equations (1) and (2) as discussed above, then the determined AoD may be used as the expected direction.

The beam proximity unit 580 may be configured to determine a proximity of a beam direction of a PRS resource beam, corresponding to a source location, and an expected direction of the UE 500 corresponding to the source location. The beam proximity unit 580 may be configured to determine the proximity of a beam direction to the expected direction combination for each of multiple PRS resources corresponding to one or more source locations. The beam proximity unit 580 may determine the proximity of a beam direction and an expected direction in one or more of a variety of ways. For example, the beam proximity unit 580 may determine a proximity using one or more mathematical techniques, e.g., to find a difference in beam angle and expected angle, to find a ratio of beam angle and expected angle, and/or by applying one or more functions to the beam direction and expected direction. The beam proximity unit 580 may determine proximity of a beam direction and an expected direction based on azimuth components of the beam and expected directions only, based on elevation components of the beam and expected directions only, or based on azimuth and elevation components of the beam and expected directions. For example, the beam proximity unit 580 may determine an absolute difference between the azimuth component of a beam angle ($\phi_b$) and the azimuth component of an expected angle ($\phi_e$), i.e., $|\phi_b - \phi_e|$. As another example, the beam proximity unit 580 may determine an absolute difference between the elevation component (e.g., zenith component) of a beam angle ($\theta_{bz}$) and the elevation component (e.g., zenith component) of an expected angle ($\theta_{ez}$), i.e., $|\theta_{bz} - \theta_{ez}|$ As another example, the beam proximity unit 580 may determine an absolute angle difference between the three-dimensional beam angle and the three-dimensional expected angle.

The beam proximity unit 580 may be configured to determine a priority (ranking) of PRS resources to process (to measure, or to report, or to measure and report) based on relative proximities of beam directions and expected direction(s). For example, the beam proximity unit 580 may determine a priority of PRS resources according to angle-domain proximities of beam directions of PRS resources and the respective expected direction(s). Each PRS resource has a corresponding source location and different source locations have different expected directions to the UE 500, with each PRS resource having a respective expected direction, and with multiple PRS resources that have the same corresponding PRS source location having the same expected direction. For example, a PRS resource whose beam has a closer proximity to an expected direction (from the source location of the PRS resource to the UE 500) may be given higher priority (ranked higher) than another PRS resource whose beam has a further proximity to the expected direction. The ranking may be based on the azimuth proximity alone, the elevation proximity alone, or both the azimuth proximity and elevation proximity. The beam proximity unit 580 may rank proximities based on a function of both the absolute difference in azimuth angle and the absolute difference in elevation angle. For example, the beam proximity unit 580 may rank proximities according to a maximum, mean, or minimum of ($|\phi_b - \phi_e|$, $|\theta_b - \theta_e|$) of multiple proximity angles (e.g., the beam with the highest differential component being ranked lowest, or the smallest differential component being ranked highest, or a beam with a lowest mean of the differentials being ranked highest). As another example, the proximity rank may be based on the angle differential between the beam direction and the expected direction in a plane containing both the beam direction and the expected direction (and the source location), e.g., with the priority from highest to lowest corresponding to the beam proximity from closest (smallest) to furthest (largest). The beam proximity unit 580 may be configured to rank the PRS resources based on proximity of beam direction and expected direction in response to the beam directions being provided to the UE 500 and the expected direction(s) being obtained (e.g., determined and/or provided to) the UE 500. The beam proximity unit 580 may be configured to rank the PRS resources based on proximity of beam direction and expected direction in response to receiving a request to prioritize processing of PRS resources based on proximity of beam direction and expected direction. The UE 500 (e.g., the PRS measurement unit 560 and/or the PRS measurement reporting unit 570) may be configured to process PRS resources in accordance with a priority indicated by AD (e.g., a physical order of the indicated PRS and/or a numerical order of PRS indexes) scheduling the PRS resources absent the beam proximity unit 580 determining a priority of PRS resources based on proximity of beam direction and expected direction (e.g., absent beam direction and expected direction being obtained or absent a request to use beam direction and expected direction proximity prioritization).

Figure 8:
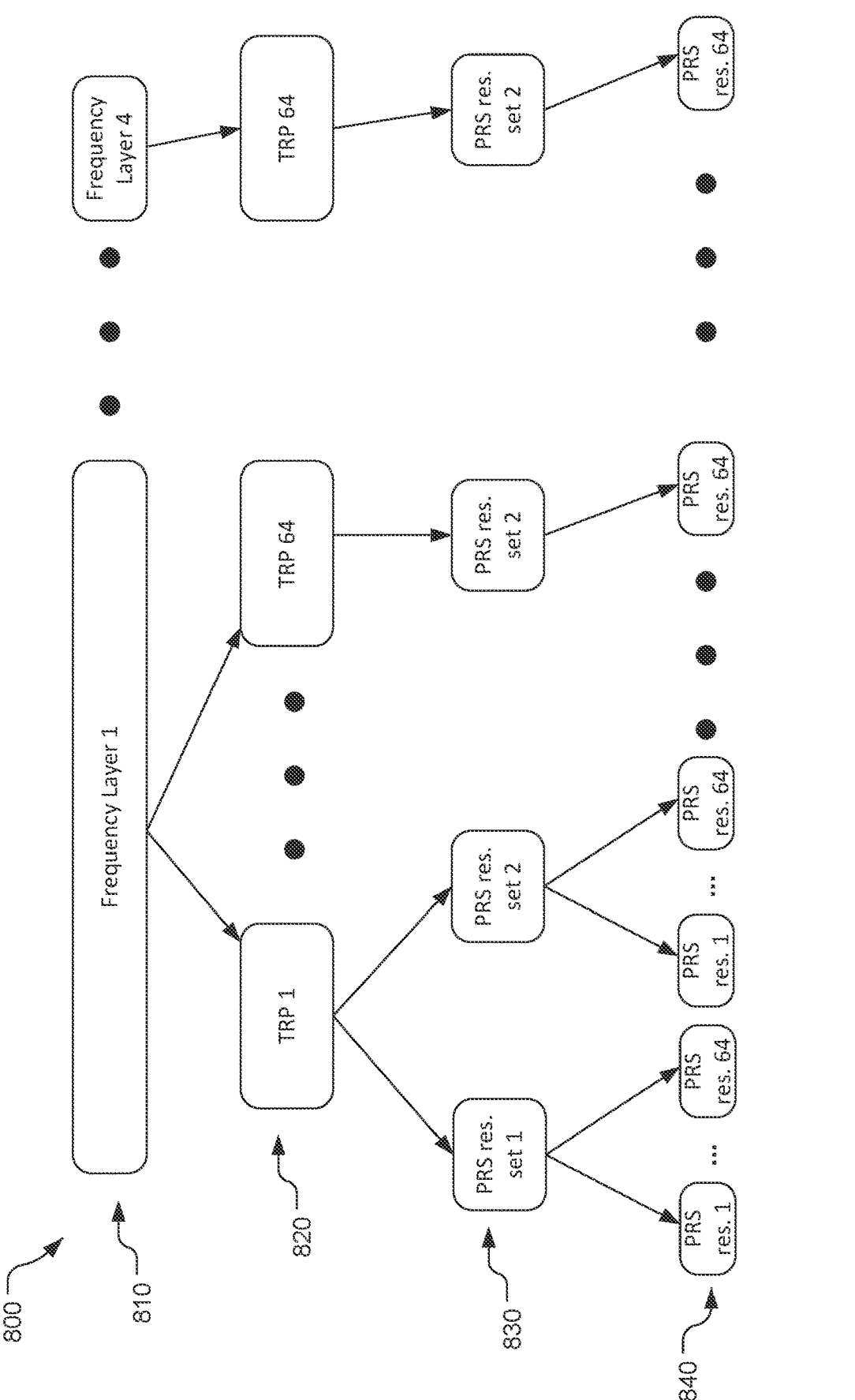
FIG. 8 is a block diagram of a hierarchical priority of assistance data for measuring and/or reporting PRS resources.

Referring also to FIG. 8, assistance data 800 from the server 400 indicates frequency layers 810, TRPs 820, PRS resource sets 830, and PRS resources 840 arranged in a hierarchical priority. The AD 800 is arranged in order of priority and the frequency layers, TRPs, PRS resource sets, and PRS resources are provided with index numbers for their respective priorities in their respective portions of the priority indicated by the AD 800 (e.g., PRS resources within a PRS resource set). In the priority indicated by the AD 800, the frequency layers 810 have a frequency layer priority such that all the scheduled PRS resources of a frequency layer will be measured before any PRS resource of the next-highest-priority frequency layer. Similarly, the TRPs 820 associated with each of the frequency layers 810 have a TRP priority, the PRS resource sets 830 associated with each TRP priority have a PRS resource set priority, and the PRS resources 840 associated with each PRS resource set have a PRS resource priority. Index numbers may be reused (as shown) for each subset of the priority indicated by the AD 800 (e.g., PRS resources within a PRS resource set, PRS resource sets corresponding to a TRP, etc.). The AD 800 includes full complements of four frequency layers, 64 TRPs in each frequency layer, two PRS resource sets for each TRP, and 64 PRS resources in each PRS resource set, but other quantities of frequency layers, TRPs, PRS resource sets, and/or PRS resource may be used, and quantities may be different (e.g., different quantities of PRS resources in different PRS resource sets).

Figure 9:
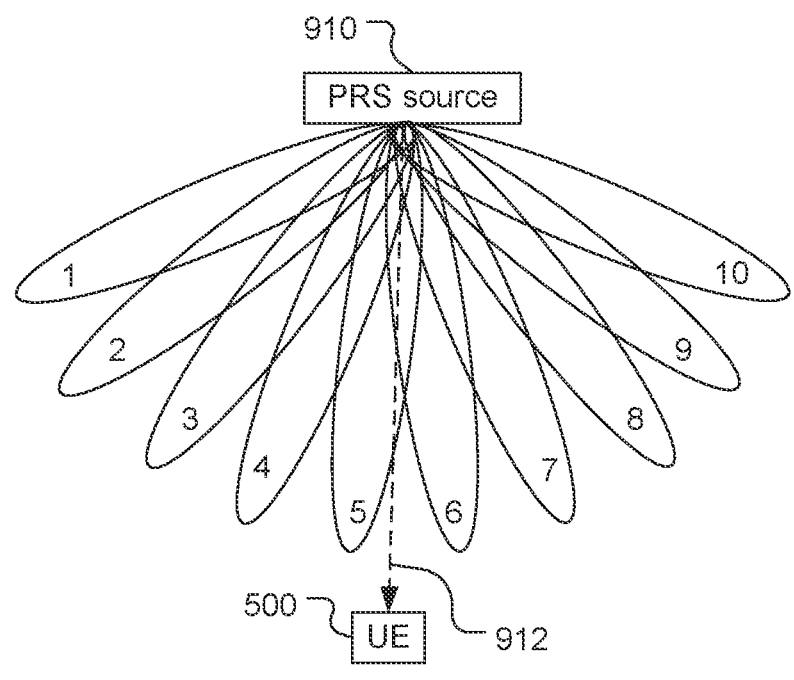
FIG. 9 is a top view of multiple beams from a PRS source and different priorities for processing the beams.

Referring also to FIG. 9, the PRS measurement unit 560 and/or the PRS measurement reporting unit 570 may use a prioritization of PRS resources based on the PRS resources/PRS resource sets/TRPs/PFLs (Positioning Frequency Layers) selected for a particular positioning technique. For example, the PRS measurement unit 560 and/or the PRS measurement reporting unit 570 may use the priority indicated by the AD 800 for prioritizing processing of PRS resources for TDOA positioning and/or RTT positioning. As another example, the PRS measurement unit 560 and/or the PRS measurement reporting unit 570 may use a priority determined by the beam proximity unit 580 for processing PRS resources, e.g., for AoD positioning. In the example shown in FIG. 9, a PRS source 910 emits 10 beams corresponding to 10 PRS resources with index numbers 1, 2, 3, 4, 5, 6, 7, 8, 9, 10 in the AD. The UE 500 may prioritize processing (measuring, or reporting, or measuring and reporting) of the PRS resources according to an AD priority 920 corresponding to the index numbers, e.g., for RTT and TDOA positioning. The AD priority 920 of the beam indexes is 1, 2, 3, 4, 5, 6, 7, 8, 9, 10. The beams have beam proximities 930, i.e., angle differences between respective beam directions and an expected direction 912 from the PRS source 910 to the UE 500. The UE 500 may prioritize processing of the PRS resources according to a beam proximity priority 940, e.g., for AoD positioning, giving higher processing priority to beams with closer beam proximities. The beam proximity priority 940 of the beam indexes is 5, 6, 4, 7, 3, 8, 2, 9, 1, 10. Consequently, for example, if the UE 500 is limited to processing four PRS resources per PRS resource set and the beams 1-10 shown in FIG. 9 all correspond to the same PRS resource set, then for TDOA or RTT processing, the UE 500 will process PRS resources of beams 1, 2, 3, 4, and for AoD positioning will process PRS resources of beams 4, 5, 6, 7.

The prioritization of PRS resource processing used by the UE 500 may depend on whether the UE 500 concurrently processes PRS resources for different positioning methods. If the UE 500 is not concurrently processing PRS resources for different positioning methods (e.g., because the UE 500 does not support concurrent processing, decides not to process concurrently, is not requested to process concurrently, or is requested not to process concurrently), then the UE 500 can process the PRS resources according to the appropriate priority. For example, with TDOA and/or RTT positioning and AoD positioning time division multiplexed, the UE 500 may use AD priority during TDOA or RTT positioning, and may use beam proximity priority during AoD positioning. If the UE 500 supports and is to process PRS resources for TDOA/RTT and AoD positioning concurrently, then the UE 500 may be configured to choose which priority to use. For example, the UE 500 may be configured to use beam-proximity priority for concurrent processing for TDOA and AoD or concurrent processing for RTT and AoD, or to use AD priority for concurrent processing for TDOA and AoD or concurrent processing for RTT and AoD, to use the priority according to a request received by the UE 500, e.g., from the server 400. The UE 500 may be configured to use the AD priority for the frequency layers, the TRPs, and the PRS resource sets, and to use the beam-proximity priority for the PRS resources within each PRS resource set. Thus, the UE 500 may determine a highest-priority PRS resource set as the resource set with the highest-priority index number corresponding to a highest-priority index-numbered TRP corresponding to the highest-priority index-numbered frequency layer, and within that PRS resource set, determine the priority of the PRS resources according to beam proximity (beam direction proximity to corresponding expected direction).

The PRS resource prioritization discussed herein is applicable for any type of PRS (DL-PRS, SL-PRS, UL-PRS). Thus, for example, the PRS source 610 and/or the PRS source 910 may be a TRP transmitting DL-PRS or a UE transmitting SL-PRS or UL-PRS.

Figure 10:
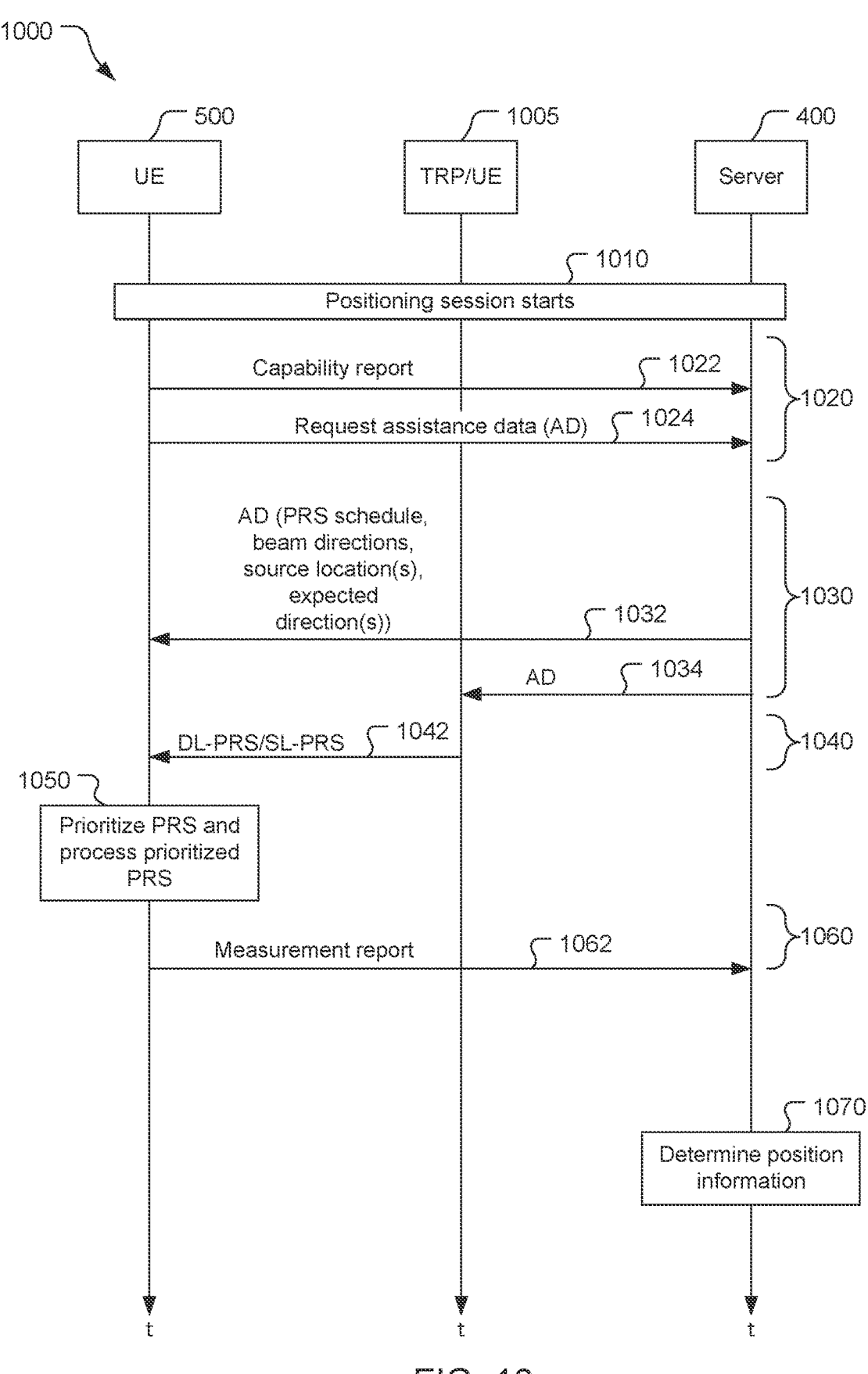
FIG. 10 is a signaling and process flow for providing, prioritizing, and processing PRS.

Referring to FIG. 10, with further reference to FIGS. 1-9, a signaling and process flow 1000 for providing, prioritizing, and processing PRS includes the stages shown. The flow 1000 is an example, as stages may be added, rearranged, and/or removed.

At stage 1010, a positioning session is started. For example, the UE 500 and the server 400 perform a handshaking procedure via a TRP to establish a communication session for exchanging signaling for use in determining a position (location) of the UE 500.

At stage 1020, the UE 500 may send a capability report 1022 and a request 1024 for assistance data (AD) to the server 400. The PRS measurement unit 560 and/or the PRS measurement reporting unit 570 may send the capability report 1022 indicating one or more capabilities of the UE 500 for measuring and/or reporting PRS (e.g., maximum PRS resources (e.g., per resource set) measurable by the UE 500, maximum PRS resources (e.g., per resource set) for which measurements may be reported, etc.). For example, the report 1022 may explicitly indicate a measurement capacity of PRS resources per PRS resource set that may be measured and/or a reporting capacity of PRS resources per PRS resource set that may be reported. The capability report 1022 may provide UE capabilities regarding DL PRS resources for AoD, e.g., maximum number of DL PRS resource sets per TRP per frequency layer, maximum number of TRPs across all PFLs, and/or maximum number of PFLs supported by the UE 500. The capability report 1022 may provide UE capabilities regarding DL PRS resources for DL AoD on a frequency band, e.g., maximum number of DL PRS resources per DL PRS resource set, and/or maximum number of DL PRS resources per PFL. The capability report 1022 may provide UE capabilities regarding DL PRS resources for DL AoD on a frequency band combination, for example: maximum number of DL PRS resources supported by the UE 500 across all PFLs, TPRs and DL PRS resources sets for FR1 only; maximum number of DL PRS resources supported by the UE 500 across all PFLs, TPRs and DL PRS resources sets for FR2 only; maximum number of DL PRS resources supported by the UE 500 across all PFLs, TPRs and DL PRS resources sets for FR1 in FR1/FR2 mixed operation; and/or maximum number of DL PRS resources supported by the UE 500 across all PFLs, TPRs and DL PRS resources sets for FR2 in FR1/FR2 mixed operation. The measurement capacity, if included in the capability report 1022, may implicitly indicate the reporting capacity. The capability report 1022 may indicate a capability of the UE 500 to process PRS resources concurrently for different positioning techniques, e.g., AoD and RTT, or AoD and TDOA.

At stage 1030, the server 400 determines and sends AD 1032 to the UE 500 and sends AD 1034 to a TRP/UE 1005 (i.e., a TRP or a UE). The server 400 determines a PRS schedule and may determine one or more expected directions (from one or more source locations of the scheduled PRS resources to the UE 500, e.g., using E-CID), and sends the AD 1032 with the PRS schedule, beam directions for the PRS resources, and possibly the expected direction(s). The AD 1032 may include the source location(s) of the PRS resources, e.g., especially if the AD 1032 does not include the expected direction(s). The server 400 may indicate a priority of the PRS resources in the AD 1032, e.g., by the order of the PRS resources in the AD and/or with index numbers assigned to the PRS resources. The AD 1032 may include a request for the UE 500 to process PRS resources concurrently for different positioning techniques, e.g., AoD and RTT, or AoD and TDOA. The server 400 sends AD 1034, including the PRS schedule, to the TRP/UE 1005.

At stage 1040, the TRP/UE 1005 sends PRS 1042 to the UE 500. For example, the TRP/UE 1005 sends DL-PRS or SL-PRS as appropriate to the UE 500 in accordance with the PRS schedule indicated in the AD 1034.

At stage 1050, the UE 500 prioritizes processing of the PRS and processes the PRS. For example, the beam proximity unit 580 may determine a beam-proximity priority based on proximities of beam directions for the PRS resources of the PRS 1042 and expected direction(s) corresponding to the PRS resources of the PRS 1042. The beam proximity unit 580 may obtain the expected direction(s) from the AD 1032 and/or by determining the expected direction(s) based on source locations provided in the AD 1032 and a location estimate of the UE 500 (e.g., from E-CID) and/or from previously-determined AoD(s) from the PRS source(s) to the UE 500. The UE 500 may determine whether to use the beam-proximity priority or another priority, e.g., based on a positioning technique being implemented as established at stage 1010, based on information being provided for determining the beam-proximity priority, etc. The PRS measurement unit 560 may prioritize measurement of PRS resources based on the determined priority (e.g., beam-proximity priority or AD priority (e.g., a legacy priority)). The PRS measurement unit 560 may determine which PRS resources to measure based on the determined priority and any measurement limitation(s) of the UE 500, e.g., a limited quantity of PRS resources per PRS resource set that may be measured. Also or alternatively, the PRS measurement reporting unit 570 may determine which PRS resource measurements to report based on the determined priority (e.g., beam-proximity priority or AD priority).

At stage 1060, the UE 500 may report measured PRS. For example, the PRS measurement reporting unit 570 may send a PRS measurement report 1062 to the server 400 (directly or via the TRP 300). The PRS measurement report 1062 may comprise one or more messages (e.g., separate messages). The report 1062 may include measurements of PRS resources with beams in close proximity to the UE 500 (e.g., the N closest beams to the expected direction from the PRS source to the UE 500). The report 1062 may include one or more PRS resource measurements for one or more PRS resources beyond those prioritized using a beam-proximity priority. The report 1062 may include other position information (e.g., pseudoranges, location estimates) in addition to PRS resource measurements.

At stage 1070, the server 400 determines position information. For example, the processor 410 may use the measurement report 1062 to determine one or more pseudoranges and/or one or more location estimates of the UE 500 (the target UE) using one or more appropriate positioning techniques (e.g., AoD, RTT, multi-RTT, DL-TDOA, etc.).

Referring to FIG. 11, with further reference to FIGS. 1-10, a method 1100 of processing PRS includes the stages shown. The method 1100 is, however, an example and not limiting. The method 1100 may be altered, e.g., by having stages added, removed, rearranged, combined, performed concurrently, and/or having single stages split into multiple stages.

At stage 1110, the method 1100 includes receiving, at a UE, assistance data including a schedule of a plurality of PRS resources having a plurality of beam directions, each of the plurality of PRS resources corresponding to a respective source location. For example, the server 400 sends a PRS schedule to the UE 500, e.g., as part of the AD 1032, and the UE 500 receives the AD 1032 transmitted by the server 400 via the TRP 1005 to the UE 500. The processor 510, possibly in combination with the memory 530, in combination with the transceiver 520 (e.g., the wireless receiver 244 and the antenna 246) may comprise means for receiving the assistance data including the schedule of the plurality of PRS resources.

At stage 1120, the method 1100 includes determining a processing priority of the plurality of PRS resources based on a proximity of each of the plurality of beam directions to a respective expected direction from the respective source location to the UE. For example, the beam proximity unit 580 may determine a prioritization for PRS resources and/or PRS resource measurements based on relative values of proximities of beam directions to the expected direction(s). Each PRS resource has a corresponding source location, and multiple PRS resources may have the same source location and thus the same expected direction. The processor 510, possibly in combination with the memory 530, may comprise means for determining the processing priority of the plurality of PRS resources.

At stage 1130, the method 1100 includes measuring one or more of the plurality of PRS resources based on the processing priority. The PRS measurement unit 560 may measure PRS resources based on the determined beam-proximity priority (regardless of what PRS resource measurements will be reported), e.g., prioritize which PRS resources to measure based on relative beam-proximities corresponding to the PRS resources. The processor 510, possibly in combination with the memory 530, possibly in combination with the transceiver 520 (e.g., the wireless receiver 244 and the antenna 246), may comprise means for measuring one or more of the plurality of PRS resources based on the processing priority.

Implementations of the method 1100 may include one or more of the following features. In an example implementation, the processing priority is determined in response to the assistance data including the respective expected direction for each of the plurality of PRS resources. For example, the UE 500 may determine and use the processing priority only if the expected direction(s) is(are) provided in the AD 1032, and may process the PRS in accordance with legacy operation otherwise (e.g., in accordance with the order of the PRS resources in the PRS schedule). In another example implementation, determining the processing priority includes determining separate processing sub-priorities, as parts of the processing priority, for different resource sets of the plurality of PRS resources. The beam proximity unit 580 may, for example, prioritize (rank) PRS resources within a PRS resource set by closeness of beam direction and expected direction to the UE 500. In another example implementation, the processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources. The UE 500 may, for example, prioritize processing of PRS resources at the TRP and PRS resource set levels in accordance with the priority indicated by the PRS schedule in the AD 1032, and prioritize processing of PRS resources within the PRS resource sets based on proximities of beams and the expected direction(s) corresponding to the PRS resources. In another example implementation, the method 1100 includes reporting one or more measurements of the one or more of the plurality of PRS resources based on the processing priority. For example, the PRS measurement reporting unit 570 may report PRS resource measurements based on beam proximity of beam directions relative to the respective expected direction(s) from the source location(s) of the PRS resources to the UE. The processor 510, possibly in combination with the memory 530, in combination with the transceiver 520 (e.g., the wireless transmitter 242 and the antenna 246) may comprise means for reporting one or more measurements of the one or more of the plurality of PRS resources based on the processing priority.

Also or alternatively, implementations of the method 1100 may include one or more of the following features. In an example implementation, the processing priority is determined in response to PRS resource measurements being requested for an angle-of-departure positioning technique. For example, the PRS measurement unit 560 and/or the PRS measurement reporting unit 570 may prioritize PRS resources for measurement and/or PRS resource measurements for reporting based on beam proximities in response to the server 400 requesting AoD positioning (e.g., in the AD 1032). The processor 510, possibly in combination with the memory 530, in combination with the transceiver 520 (e.g., the wireless receiver 244 and the antenna 246) may comprise means for determining the processing priority in response to PRS resource measurements being requested for AoD positioning. In another example implementation, the processing priority is determined in response to PRS resource measurements being requested for concurrent support of an angle-of-departure positioning technique and at least one of a time-difference-of-arrival positioning technique or a round-trip-time positioning technique. For example, the UE 500 may prioritize PRS resource processing based on beam proximities in response to AoD positioning being requested to be performed concurrently with either RTT positioning or TDOA positioning. The processor 510, possibly in combination with the memory 530, in combination with the transceiver 520 (e.g., the wireless receiver 244 and the antenna 246) may comprise means for determining the processing priority in response to RPS resource measurements being requested for concurrent support of AoD positioning and TDOA positioning and/or RTT positioning.

Also or alternatively, implementations of the method 1100 may include one or more of the following features. In an example implementation, the proximity of each of the plurality of beam directions to the respective expected direction is an azimuth proximity of a first azimuth direction of each of the plurality of beam directions to a respective second azimuth direction of the respective expected direction. For example, beam proximity may be determined based on azimuth components of beam direction and expected direction (e.g., absolute value of the difference in azimuth components). In another example implementation, the proximity of each of the plurality of beam directions to the respective expected direction is an elevation proximity of a first elevation direction of each of the plurality of beam directions to a respective second elevation direction of the respective expected direction. For example, beam proximity may be determined based on elevation components of beam direction and expected direction (e.g., absolute value of the difference in elevation components). In another example implementation, the proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction. The UE 500 may determine each proximity as a function of azimuth and elevation components of the beam direction and the corresponding expected direction. In another example implementation, the plurality of PRS resources comprises a plurality of downlink PRS resources or a plurality of sidelink PRS resources.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

43

The invention claimed is:

1. A UE (user equipment) comprising:
a transceiver;
a memory; and
a processor, communicatively coupled to the transceiver and the memory, configured to:
receive assistance data including a schedule of a plurality of PRS resources (positioning reference signal resources) having a plurality of beam directions, each of the plurality of PRS resources corresponding to a respective source location;
determine a processing priority of the plurality of PRS resources based on a proximity of each of the plurality of beam directions to a respective expected direction from the respective source location to the UE; and
measure, based on the processing priority, a first PRS resource of the plurality of PRS resources before a second PRS resource of the plurality of PRS resources based on a first beam direction corresponding to the first PRS resource being closer to the expected direction than a second beam direction corresponding to the second PRS resource.

2. The UE of claim 1, wherein the processor is configured to determine the processing priority in response to the assistance data including the respective expected direction for each of the plurality of PRS resources.

3. The UE of claim 1, wherein the processor is configured to determine separate processing sub-priorities, as parts of the processing priority, for different resource sets of the plurality of PRS resources.

4. The UE of claim 1, wherein the processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources.

5. The UE of claim 1, wherein the processor is configured to report one or more measurements of the one or more of the plurality of PRS resources based on the processing priority.

6. The UE of claim 1, wherein the processor is configured to determine the processing priority in response to PRS resource measurements being requested for an angle-of-departure positioning technique.

7. The UE of claim 1, wherein the processor is configured to determine the processing priority in response to PRS resource measurements being requested for concurrent support of an angle-of-departure positioning technique and at least one of a time-difference-of-arrival positioning technique or a round-trip-time positioning technique.

8. The UE of claim 1, wherein the proximity of each of the plurality of beam directions to the respective expected direction is an azimuth proximity of a first azimuth direction of each of the plurality of beam directions to a respective second azimuth direction of the respective expected direction.

9. The UE of claim 1, wherein the proximity of each of the plurality of beam directions to the respective expected direction is an elevation proximity of a first elevation direction of each of the plurality of beam directions to a respective second elevation direction of the respective expected direction.

10. The UE of claim 1, wherein the proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

11. The UE of claim 1, wherein the plurality of PRS resources comprises a plurality of downlink PRS resources or a plurality of sidelink PRS resources.

12. A method of processing PRS resources (positioning reference signal resources), the method comprising:
receiving, at a UE (user equipment), assistance data including a schedule of a plurality of PRS resources having a plurality of beam directions, each of the plurality of PRS resources corresponding to a respective source location;
determining a processing priority of the plurality of PRS resources based on a proximity of each of the plurality of beam directions to a respective expected direction from the respective source location to the UE; and
measuring, based on the processing priority, a first PRS resource of the plurality of PRS resources before a second PRS resource of the plurality of PRS resources based on a first beam direction corresponding to the first PRS resource being closer to the expected direction than a second beam direction corresponding to the second PRS resource.

13. The method of claim 12, wherein the processing priority is determined in response to the assistance data including the respective expected direction for each of the plurality of PRS resources.

14. The method of claim 12, wherein determining the processing priority includes determining separate processing sub-priorities, as parts of the processing priority, for different resource sets of the plurality of PRS resources.

15. The method of claim 12, wherein the processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources.

16. The method of claim 12, further comprising reporting one or more measurements of the one or more of the plurality of PRS resources based on the processing priority.

17. The method of claim 12, wherein the processing priority is determined in response to PRS resource measurements being requested for an angle-of-departure positioning technique.

18. The method of claim 12, wherein the processing priority is determined in response to PRS resource measurements being requested for concurrent support of an angle-of-departure positioning technique and at least one of a time-difference-of-arrival positioning technique or a round-trip-time positioning technique.

19. The method of claim 12, wherein the proximity of each of the plurality of beam directions to the respective expected direction is an azimuth proximity of a first azimuth direction of each of the plurality of beam directions to a respective second azimuth direction of the respective expected direction.

20. The method of claim 12, wherein the proximity of each of the plurality of beam directions to the respective expected direction is an elevation proximity of a first elevation direction of each of the plurality of beam directions to a respective second elevation direction of the respective expected direction.

21. The method of claim 12, wherein the proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

22. The method of claim 12, wherein the plurality of PRS resources comprises a plurality of downlink PRS resources or a plurality of sidelink PRS resources.

23. A UE (user equipment) comprising:
    means for receiving assistance data including a schedule of a plurality of PRS resources (positioning reference signal resources) having a plurality of beam directions, each of the plurality of PRS resources corresponding to a respective source location;
    means for determining a processing priority of the plurality of PRS resources based on a proximity of each of the plurality of beam directions to a respective expected direction from the respective source location to the UE; and
    means for measuring, based on the processing priority, a first PRS resource of the plurality of PRS resources before a second PRS resource of the plurality of PRS resources based on a first beam direction corresponding to the first PRS resource being closer to the expected direction than a second beam direction corresponding to the second PRS resource.

24. The UE of claim 23, wherein the means for determining the processing priority comprise means for determining the processing priority in response to the assistance data including the respective expected direction for each of the plurality of PRS resources.

25. The UE of claim 23, wherein the means for determining the processing priority comprise means for determining separate processing sub-priorities, as parts of the processing priority, for different resource sets of the plurality of PRS resources.

26. The UE of claim 23, wherein the processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources.

27. The UE of claim 23, further comprising means for reporting one or more measurements of the one or more of the plurality of PRS resources based on the processing priority.

28. The UE of claim 23, wherein the means for determining the processing priority comprise means for determining the processing priority in response to PRS resource measurements being requested for an angle-of-departure positioning technique.

29. The UE of claim 23, wherein the means for determining the processing priority comprise means for determining the processing priority in response to PRS resource measurements being requested for concurrent support of an angle-of-departure positioning technique and at least one of a time-difference-of-arrival positioning technique or a round-trip-time positioning technique.

30. The UE of claim 23, wherein the proximity of each of the plurality of beam directions to the respective expected direction is an azimuth proximity of a first azimuth direction of each of the plurality of beam directions to a respective second azimuth direction of the respective expected direction.

31. The UE of claim 23, wherein the proximity of each of the plurality of beam directions to the respective expected direction is an elevation proximity of a first elevation direction of each of the plurality of beam directions to a respective second elevation direction of the respective expected direction.

32. The UE of claim 23, wherein the proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

33. A non-transitory, processor-readable storage medium comprising processor-readable instructions to cause a processor of a UE (user equipment) to:
    receive assistance data including a schedule of a plurality of PRS resources (positioning reference signal resources) having a plurality of beam directions, each of the plurality of PRS resources corresponding to a respective source location;
    determine a processing priority of the plurality of PRS resources based on a proximity of each of the plurality of beam directions to a respective expected direction from the respective source location to the UE; and
    measure, based on the processing priority, a first PRS resource of the plurality of PRS resources before a second PRS resource of the plurality of PRS resources based on a first beam direction corresponding to the first PRS resource being closer to the expected direction than a second beam direction corresponding to the second PRS resource.

34. The storage medium of claim 33, wherein the processor-readable instructions to cause the processor to determine the processing priority comprise processor-readable instructions to cause the processor to determine the processing priority in response to the assistance data including the respective expected direction for each of the plurality of PRS resources.

35. The storage medium of claim 33, wherein the processor-readable instructions to cause the processor to determine the processing priority comprise processor-readable instructions to cause the processor to determine separate processing sub-priorities, as parts of the processing priority, for different resource sets of the plurality of PRS resources.

36. The storage medium of claim 33, wherein the processing priority prioritizes subsets of the plurality of PRS resources within respective resource sets based on the proximity of each of the plurality of beam directions to the respective expected direction from the respective source location to the UE, and prioritizes first portions of the plurality of PRS resources corresponding to different transmission/reception points, and second portions of the plurality of PRS resources corresponding to the respective resource sets, based on a priority indicated in the schedule of the plurality of PRS resources.

37. The storage medium of claim 33, wherein the storage medium further comprises processor-readable instructions to cause the processor to report one or more measurements of the one or more of the plurality of PRS resources based on the processing priority.

38. The storage medium of claim 33, wherein the processor-readable instructions to cause the processor to determine the processing priority comprise processor-readable instructions to cause the processor to determine the processing priority in response to PRS resource measurements being requested for an angle-of-departure positioning technique.

39. The storage medium of claim 33, wherein the processor-readable instructions to cause the processor to determine the processing priority comprise processor-readable instructions to cause the processor to determine the processing priority in response to PRS resource measurements being requested for concurrent support of an angle-ofdeparture positioning technique and at least one of a time-difference-of-arrival positioning technique or a round-trip-time positioning technique.

40. The storage medium of claim 33, wherein the proximity of each of the plurality of beam directions to the respective expected direction is an azimuth proximity of a first azimuth direction of each of the plurality of beam directions to a respective second azimuth direction of the respective expected direction.

41. The storage medium of claim 33, wherein the proximity of each of the plurality of beam directions to the respective expected direction is an elevation proximity of a first elevation direction of each of the plurality of beam directions to a respective second elevation direction of the respective expected direction.

42. The storage medium of claim 33, wherein the proximity of each of the plurality of beam directions to the respective expected direction is a function of a first azimuth direction of a respective one of the plurality of beam directions, a second azimuth direction of the respective expected direction, a first elevation direction of the respective one of the plurality of beam directions, and a second elevation direction of the respective expected direction.

\* \* \* \* \*